United States Patent
Bogart et al.

(10) Patent No.: US 6,833,931 B1
(45) Date of Patent: Dec. 21, 2004

(54) METHOD AND APPARATUS FOR RECORDING DIGITAL IMAGES ON PHOTOSENSITIVE MATERIAL

(76) Inventors: Zac Bogart, 956 Cheltenham Rd., Santa Barbara, CA (US) 93105; James Browning, 187 Stevens Rd., Lebanon, NH (US) 03766

( * ) Notice: Subject to any disclaimer, the term of this patent is extended or adjusted under 35 U.S.C. 154(b) by 0 days.

(21) Appl. No.: 09/303,258

(22) Filed: Apr. 30, 1999

Related U.S. Application Data (60) Provisional application No. 60/083,975, filed on May 1, 1998.

(51) Int. Cl.[7] .................................................. H04N 1/04
(52) U.S. Cl. ........................ 358/1.9; 358/474; 358/494; 358/505
(58) Field of Search ........................ 358/1.9, 1.8, 474, 358/484, 487, 494, 296, 505, 506, 512; 347/232, 256

(56) References Cited

U.S. PATENT DOCUMENTS

| | | | |
|---|---|---|---|
| 3,832,488 A | 8/1974 | Fahey et al. .................... 178/15 |
| 3,988,742 A | 10/1976 | Meier et al. ............. 346/107 R |
| 4,000,495 A | 12/1976 | Pirtle ............................. 345/7 |
| 4,074,320 A | 2/1978 | Kapes, Jr .................... 358/230 |
| 4,342,504 A | 8/1982 | Ebner ............................ 354/7 |
| 4,364,064 A | 12/1982 | Baues .................... 346/107 R |
| 4,389,655 A | 6/1983 | Baues .................... 346/107 R |
| 4,475,115 A | 10/1984 | Garbe et al. ................ 346/108 |
| 4,563,747 A | 1/1986 | Tidd ............................ 364/523 |
| 4,590,492 A | 5/1986 | Meier ...................... 346/107 R |
| 4,797,691 A | 1/1989 | Akiyoshi et al. ........... 346/108 |
| 5,093,682 A | 3/1992 | Hicks ............................. 355/1 |
| 5,430,523 A * | 7/1995 | Tanibata ...................... 355/32 |
| 5,870,131 A * | 2/1999 | Yuge et al. .................. 347/232 |
| 6,198,494 B1 * | 3/2001 | Haraguchi et al. .......... 347/232 |
| 6,232,997 B1 * | 5/2001 | Nakamura et al. .......... 347/232 |

* cited by examiner

*Primary Examiner*—Thomas D. Lee
(74) *Attorney, Agent, or Firm*—Freilich, Hornbaker & Rosen

(57) ABSTRACT

The present invention is directed to a method and apparatus for exposing photosensitive material to form high quality continuous tone and/or color images thereon. The preferred apparatus includes an imaging head comprised of square pixel image generators, e.g., fiber optic tubes mounted to form a rectangular array. The pixel image generators are inclined at an angle of 45 degrees to the scan direction. As the print head scans, each fiber optic tube can expose a pixel image onto the photosensitive material. The exposure levels of the pixel images are preferably specified in a digital file representing an image to be printed. As a result of being inclined at 45 degrees, the pixel images exposed onto the photosensitive material are diamond shaped. Each pixel image overlaps its neighbor by substantially 50% of the center to center distance between pixel images. The pattern resulting from the overlapping of the pixel images generates geometrically interpolated pixel areas with each such area being about 25% of the original pixel image area. The image generators comprise groups of green, blue, and red light sources. Narrow pass spectral filters are preferably mounted between the light sources and the photosensitive material.

12 Claims, 8 Drawing Sheets

METHOD AND APPARATUS FOR RECORDING DIGITAL IMAGES ON PHOTOSENSITIVE MATERIAL

RELATED APPLICATIONS

This application claims priority based on provisional application No. 60/083975 filed May 1, 1998.

FIELD OF THE INVENTION

This invention relates generally to a method and apparatus for producing high quality continuous tone and/or color images on photosensitive material (i.e., photographic paper or film) from information provided in digital form.

DESCRIPTION OF PRIOR ART

In the field of photographic digital printers and image setters, the use of multiple light sources to create individual pixels is well known. U.S. Pat. No. 3,988,742 describes using LEDs and fiber optic light guides to deliver the light to the photosensitive material. Applications of this technology have included type setting, and the generation of lithographic films for printing. In these applications, the light output of LEDs is coupled into the input end of the fiber optic tubes. The output ends of the fiber optic tubes are arranged in a linear array. As photosensitive material is passed by the linear array of fiber optic tubes, the LED's are illuminated in such sequence as to cause the formation of indicia or images on the photosensitive material. This process is described in U.S. Pat. Nos. 3,832,488 and 4,000,495 and 5,093,682. The use of fiber optic tubes of both square and round cross sections is known.

In such applications as described above, the precision assembly of the output ends of the fiber optics is important. Poor alignment, or uneven spacing of the output ends of the fibers cause distortions in the images being generated. U.S. Pat. Nos. 4,364,064 and 4,389,655 describe devices for precisely positioning the fiber optic tubes. U.S. Pat. No. 4,590,492 describes a method for masking the ends of the fiber optic tubes to provide more precise alignment of the light sources exposing the photosensitive material.

Prior art systems have typically been used to form lithographic images and indicia for typesetting and printing consisting solely of white and black areas without intermediate tones. Due to the lack of intermediate tonal detail, such systems are tolerant of some imprecision in the quality and quantity of light delivered to the photosensitive material. More particularly, they are typically tolerant of imperfect pixel to pixel alignment because of slight pixel blooming which occurs as a consequence of using exposure levels high enough to saturate the photosensitive material.

Continuous tone images, e.g., images which are predominately composed of middle tones, whether colors or gray tones, require significant precision in pixel formation and alignment. Misalignment of one pixel relative to its neighbors will cause unwanted lines or other artifacts to appear in a continuous tone image.

SUMMARY OF THE INVENTION

The present invention is directed to a method and apparatus for exposing photosensitive material to form high quality continuous tone, color images thereon.

Embodiments of the invention are typically comprised of an imaging (or print) head comprised of multiple pixel image generators, e.g., light sources. The head is preferably mounted for linear movement in a first, i.e., scanning direction, across the width of a web of photosensitive material. The photosensitive material is mounted for linear movement in a second direction perpendicular to said first direction to enable successive scan strips (i.e., groups of scan lines) to be imaged onto said photosensitive material. The portion of the web to be printed can be referred to as an "image field" and can be considered to consist of a rectangular matrix of "rows" extending in the scan direction across the web width and "columns" extending perpendicular to the rows, i.e., longitudinally along the web. The head can be stepped or moved continuously in the scan direction with the multiple light sources being selectively enabled to expose an image onto the photosensitive material.

A system in accordance with the invention produces a field of "interpolated pixels", each interpolated pixel being formed by the overlap between adjacent pixel images. More particularly, an interpolated pixel in accordance with the invention can be formed by the overlap between adjacent pixel images displaced in the scan direction, e.g., horizontal, and/or by the overlap between adjacent pixel images displaced in the longitudinal direction, e.g., vertical.

It is an object of this invention to provide a method and apparatus for precisely delivering light to photosensitive material to allow the printing of extremely high quality continuous tone images from digital information.

It is a further object of this invention to provide a method and apparatus for blending the pixels of an image presented in digital form, so as to increase the apparent resolution and sharpness of the resulting printed image.

It is a further object of this invention to provide a low cost imaging head capable of precisely delivering light to photosensitive material with the precision required to allow the printing of extremely high quality continuous tone images.

In accordance with a preferred embodiment of the invention, the imaging head is comprised of square or rectangular pixel image generators, e.g., fiber optic tubes, mounted to form a rectangular array. The pixel image generators are inclined at an angle of 45 degrees to the scan direction. As the print head scans, each fiber optic tube can expose a pixel image onto the photosensitive material. The exposure levels of the pixel images are preferably specified in a digital file representing an image to be printed. As a result of being inclined at 45 degrees, the pixel images exposed onto the photosensitive material are diamond shaped. Each pixel image overlaps its neighbor by substantially 50% of the center to center distance between pixel images. The pattern resulting from the overlapping of the pixels images generates geometrically interpolated pixel areas with each such area being about 25% of the original pixel image area. Further, the shape of each pixel relative to the scan direction causes the exposure in the area between adjacent scan lines to remain consistent and to cause superior blending of each pixel image with its neighboring pixel images.

The generation of high quality continuous tone images requires the precise blending of the pixels imaged on the photosensitive material. Precise blending of the pixels requires that the pixels themselves be of uniform color and intensity. Fiber optic tubes operate by the principle of "total internal reflection" of the light waves introduced into the fiber optic tube. The symmetric nature of round fiber optic tubes is such that the image of the light source at the input end of the tube is delivered, more or less intact, to the output end of the tube. The nature of LEDs and other light sources is that the light emitting element does not emit perfectly uniform illumination. Consequently, the image of the LED die will propagate down a round fiber optic tube and be delivered to the end. The non-uniform nature of the image of the light element will cause the pixels to blend poorly with one another. In a fiber optic tube of square or rectangular cross section, the image is scrambled by the successive reflections off the orthogonal walls of the tube. The principles of "total internal reflection" causes most all of the light energy which enters the fiber optic tube to be delivered to the output, but with the image scrambled to such an extent as to make the light output from the fiber optic tube substantially uniform. This uniformity is desirable to achieve the highest quality of continuous tone images.

As described above, the generation of high quality continuous tone images requires extreme precision in the placement and uniformity of illumination of the pixels comprising the image. Imprecision in either of these will result in artifacts or lines appearing in the printed image. In the printing method as described herein, a plurality of independently excitable light sources is employed to provide the illumination for a matching number of pixels. When printing onto color photosensitive materials, extreme precision is required in the matching of the spectral output characteristics of the multiple light sources. If the light sources are not of precisely the same spectral characteristics, artifacts or lines will appear in the printed image. Light sources of different spectral characteristics will expose different layers of the photosensitive material with differing efficacy. It is possible to adjust the intensity of light sources to be equally effective in exposure at a particular color or shade. However, if the spectral characteristics of the light sources are not precisely matched to one another, they will not be equally effective at exposing a different color. The result will be that artifacts or lines appear in some colors of the printed image, but not others.

In a preferred embodiment of the invention, the individual light sources are matched in spectral output with the use of a narrow pass band filter for each color. The narrow pass nature of the filter restrains the exposing energy of each LED to a narrow wavelength range within which the photosensitive material will have uniform color response. The filter is fabricated in such a way as to cover all of the pixels of a given color with the same filter. In the embodiment of the invention actually constructed by the inventor, filters of two independent wavelengths were fabricated on the same substrate and placed over the ends of the fibers.

The print head can be imaged onto the photosensitive material either by intimate contact or via a lens system. In one implemented embodiment of the invention, the print head is comprised of three columns of fiber optic tube ends, each column containing 32 tube ends. The head scans across a 30 inch width of photosensitive material and exposes a strip of approximately 100 inches during each scan. After each scan, the material is advanced in the longitudinal direction by the height of the exposed strip area. The head then successively scans across the photosensitive material exposing additional strip areas to fully cover the image field. In an alternative embodiment of the invention, the head could be the full width of the material obviating the need for the head to scan across the width of the material.

DESCRIPTION OF THE PREFERRED EMBODIMENTS

Figure 1:
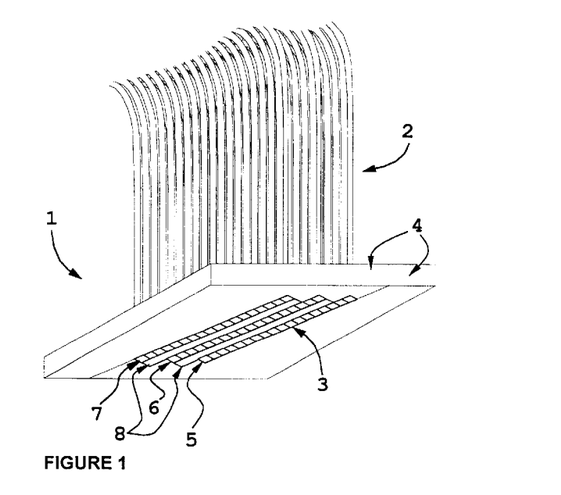
FIG. 1 is a schematic isometric illustration of a print head in accordance with the invention depicting a rectangular array of square fiber optic tube ends.

FIG. 1 shows the output end of an imaging or print head 1 in accordance with a preferred embodiment of the invention. The head is comprised of a plurality of pixel image generators, e.g., light sources defined by fiber optic tubes. The tubes are preferably of substantially square or rectangular cross section and are arranged in columns 5, 6, 7. The fiber optic tubes are selected or manufactured to be of precise cross sectional dimension. With the aid of an assembly fixture, the fiber optic tubes are clamped by frame 4 or bonded in place. Each column is comprised of multiple fiber optic tube output ends which are assembled and positioned in precise alignment with one another. The columns may be arranged in contact, or spaced apart with precision spacers 8. In either configuration, each column contains the same number of fiber optic tubes and is precisely the same length. After assembly, the fiber optic tube ends are machined to a predetermined cross section and polished. Although the assembly as shown in FIG. 1 has a planar cross section, other shapes are possible. Specifically, curved cross sections are possible which have the advantage of being able to contour to the surface of a drum around which the photosensitive material is placed, or to correct for focus aberrations common to lenses. The input ends of the fiber optic tubes are connected (not shown) to independently excitable light sources, preferably light emitting diodes (LEDs). The embodiment of the invention as shown uses fiber optic tubes to deliver the light to photosensitive material and to define the shape of pixel images exposed thereon. An alternative embodiment of the invention can employ substantially square LED dice arranged in a matrix and mounted directly into frame 4.

Figure 2:
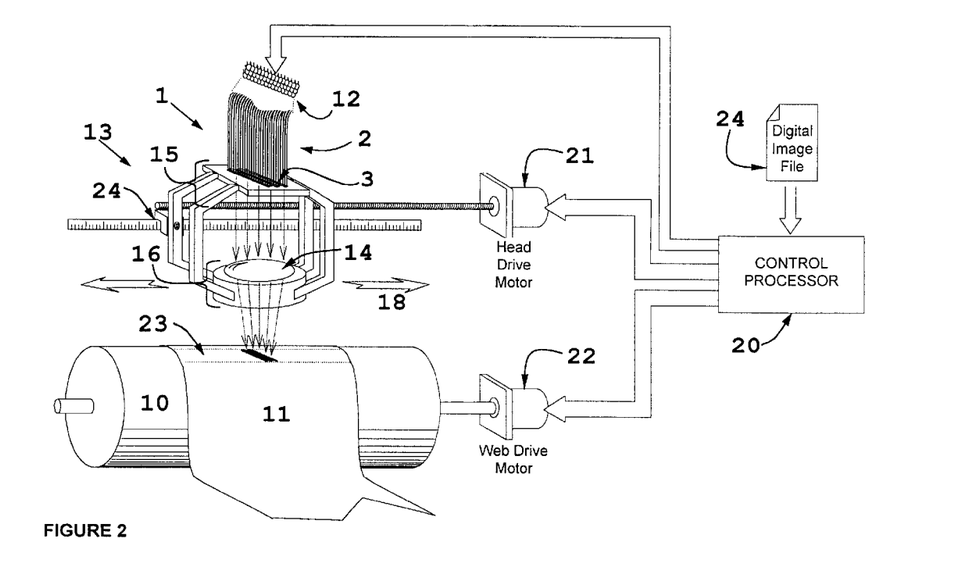
FIG. 2 is a schematic isometric illustration of a portion of a digital printer in accordance with the invention showing a drum for transporting a photosensitive material web and a print head mounted for linear movement to scan across the width of the web.

FIG. 2 shows the head 1 in place in one possible application of the invention. In this application, the image of the output ends of the fiber optic tubes 3 is projected via a lens 14 onto a target surface, i.e., a web or sheet of photosensitive material 23, which is tensioned around a drum 10. The print head assembly 15 and lens assembly 16 are mounted for linear lateral movement in a scan direction 18 parallel to the axis of the drum 10 around which the photosensitive material 23 is positioned. As the print head scans, encoder 24 indicates the columnar position of the print head along the scan line. The photosensitive material 23 is moved longitudinally perpendicular to the scan direction 18.

Figure 3:
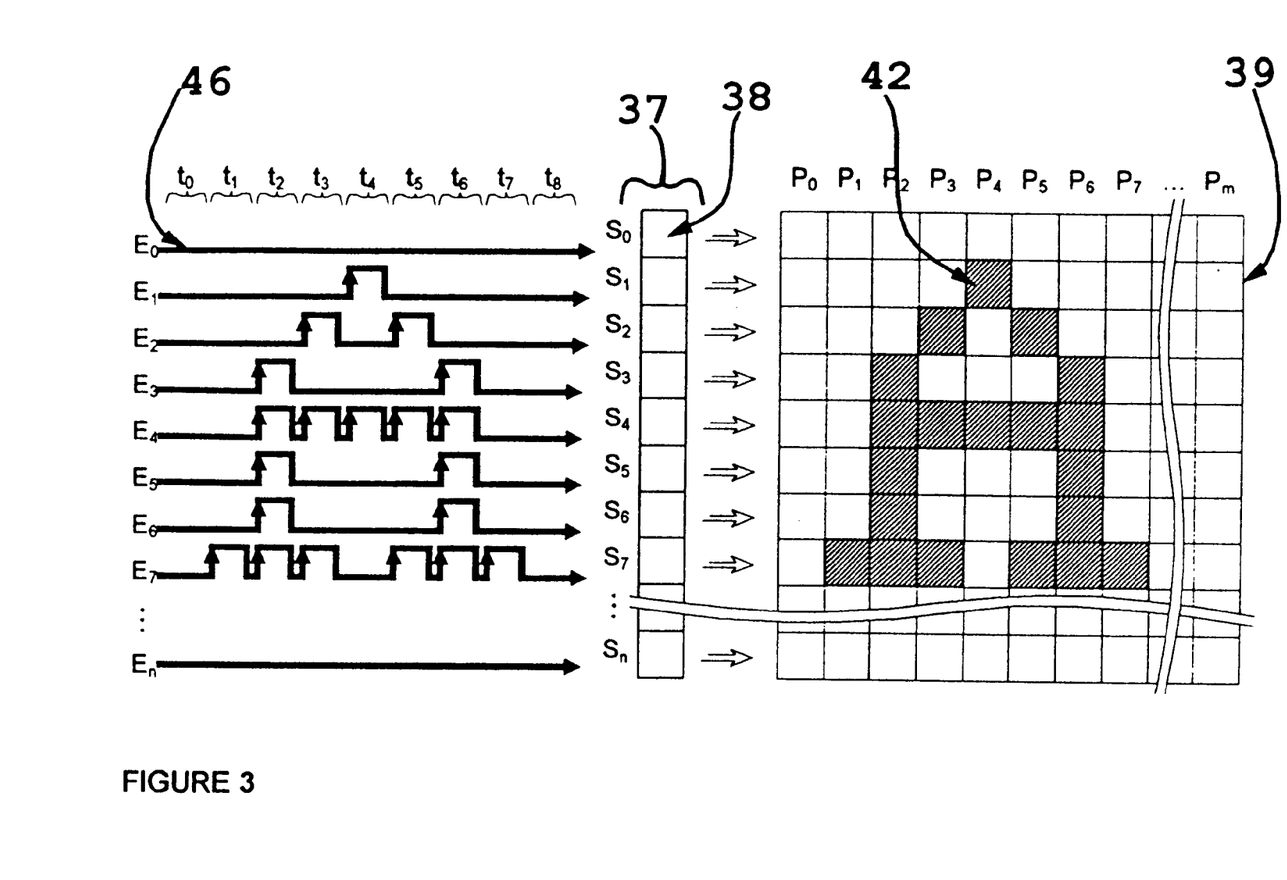
FIG. 3 is a schematic illustration depicting a prior art scheme for enabling a print head comprised of a column of square light sources to scan across a web of photosensitive material to expose pixel images thereon.

FIG. 3 shows a representation of a print head 37 which has been described in the prior art. Light sources 38, identified as $S_0$ through $S_n$, are of square cross section, and expose pixel images represented in the grid 39. As the print head scans across a row of the photosensitive material (defining an image field comprised of m columns and n rows), a pixel image can be exposed at each columnar position $P_0$ through $P_m$. The exposures of the pixel images are enabled by n separate enabling signals 46 $E_0$ through $E_n$. The enabling signals are synchronized with the encoder 24 indicated in FIG. 2.

Figure 4A:
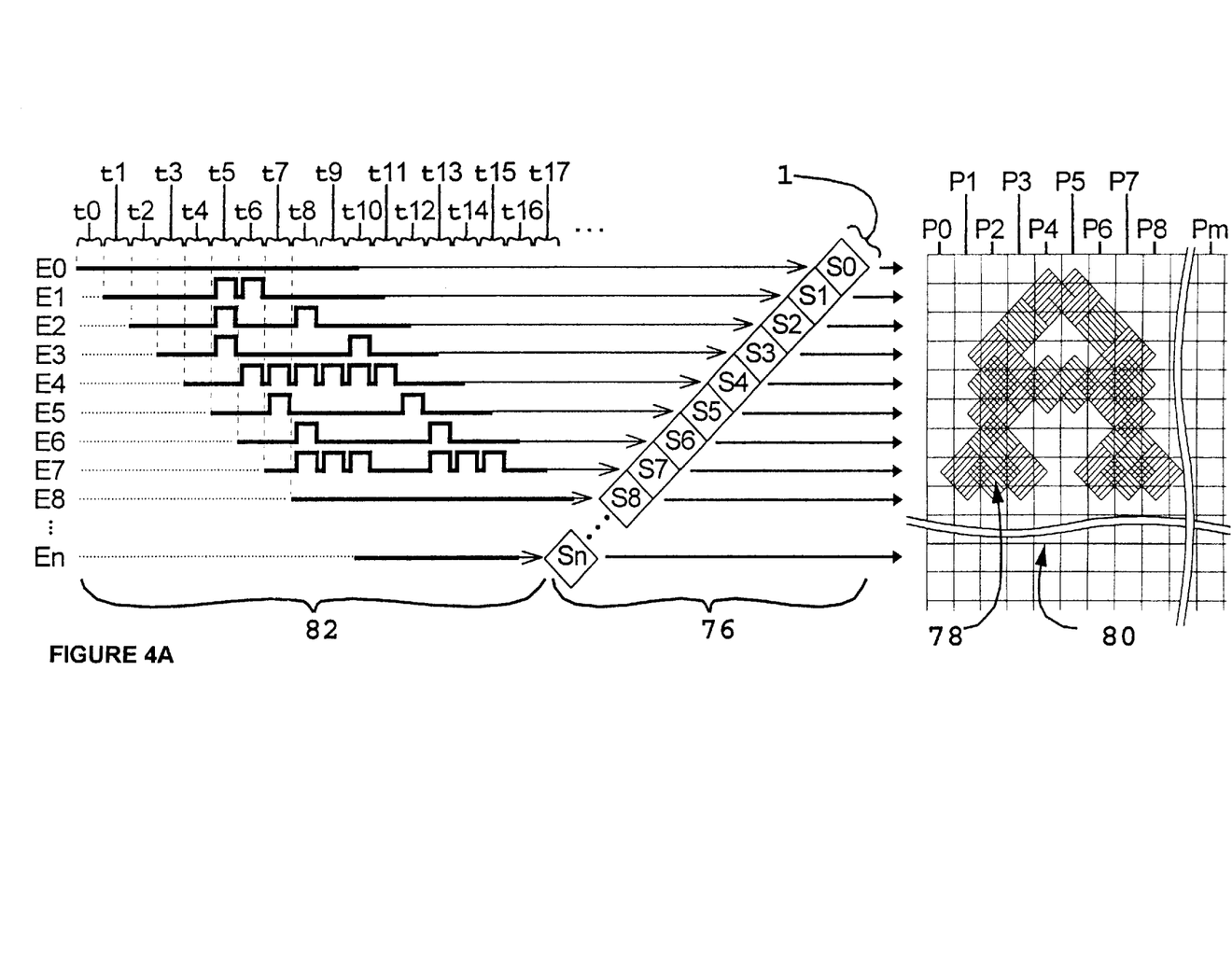
FIG. 4A is a schematic illustration depicting a preferred system in accordance with the invention for exposing pixel images onto the photosensitive material.

FIG. 4A shows a representation of a preferred head 1 in accordance with the invention. The print head is inclined at an angle of 45 degrees to the scan direction. Light sources 76 $S_0$ through $S_n$, define a diamond shaped cross section as a result of the square ends being inclined at 45 degrees relative to the scan direction. Light sources 76 $S_0$ through $S_n$, expose pixel images 78 as represented in the grid 80. As the print head 70 scans across the photosensitive material, the pixel images can be exposed at each position $P_0$ through $P_m$. As a consequence of being inclined at 45 degrees, the pixel images associated with a single columnar position P are not exposed simultaneously. Instead, pixel $P_m, S_0$ is exposed at the same time as pixels $P_{m-1}, S_1$ and $P_{m-2}, S_2$, etc. The exposures of the pixel images are enabled by n separate enabling signals 82 $E_0$ through $E_n$. The enabling signals are synchronized with the encoder 24 indicated in FIG. 2. As the head scans, the pixel images in accordance with the invention overlap. That is, the pixel images of each scan row overlap with the pixel images of rows above and below by substantially 50% of the center to center distance between pixel images. Also, each pixel image along a row overlaps with pixel images horizontally displaced before and after by substantially 50% of the center to center distance between pixel images.

Figure 4B:
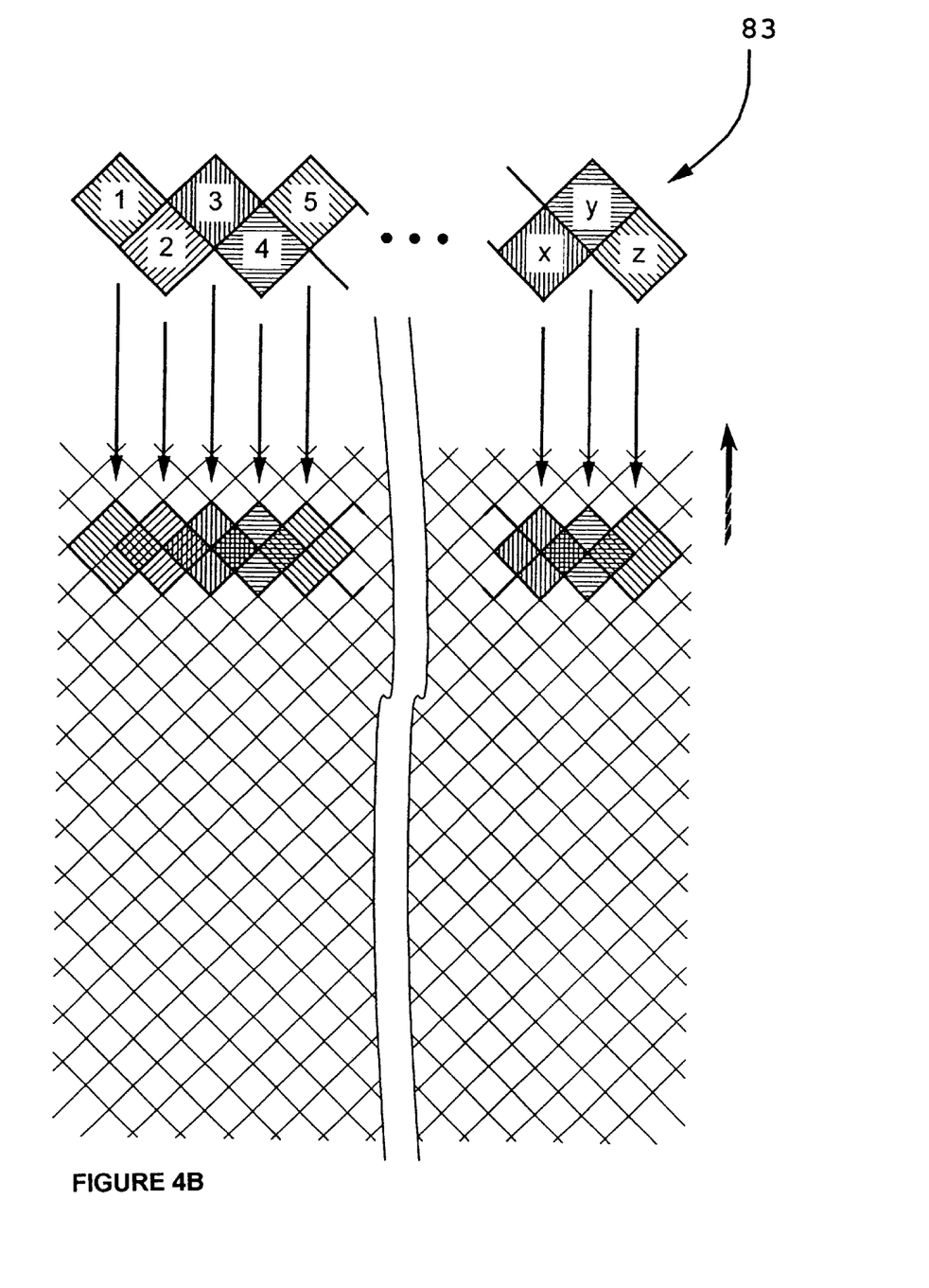
FIG. 4B schematically depicts an alternative head configuration.

Whereas the head in FIG. 4A scans laterally perpendicular to the longitudinal direction of the photosensitive material 23, FIG. 4B depicts an alternative head configuration 83 in which the head can be fixed. More particularly, FIG. 4B depicts a head extending across the width of the photosensitive material 23. The head 83 is comprised of at least two rows of square pixel image generators (e.g., fiber optic tube ends) oriented at a 45 degree angle with respect to the lateral and longitudinal directions. The head 83 is capable of imaging the same pixel image pattern as is depicted in FIG. 4A.

Figure 5:
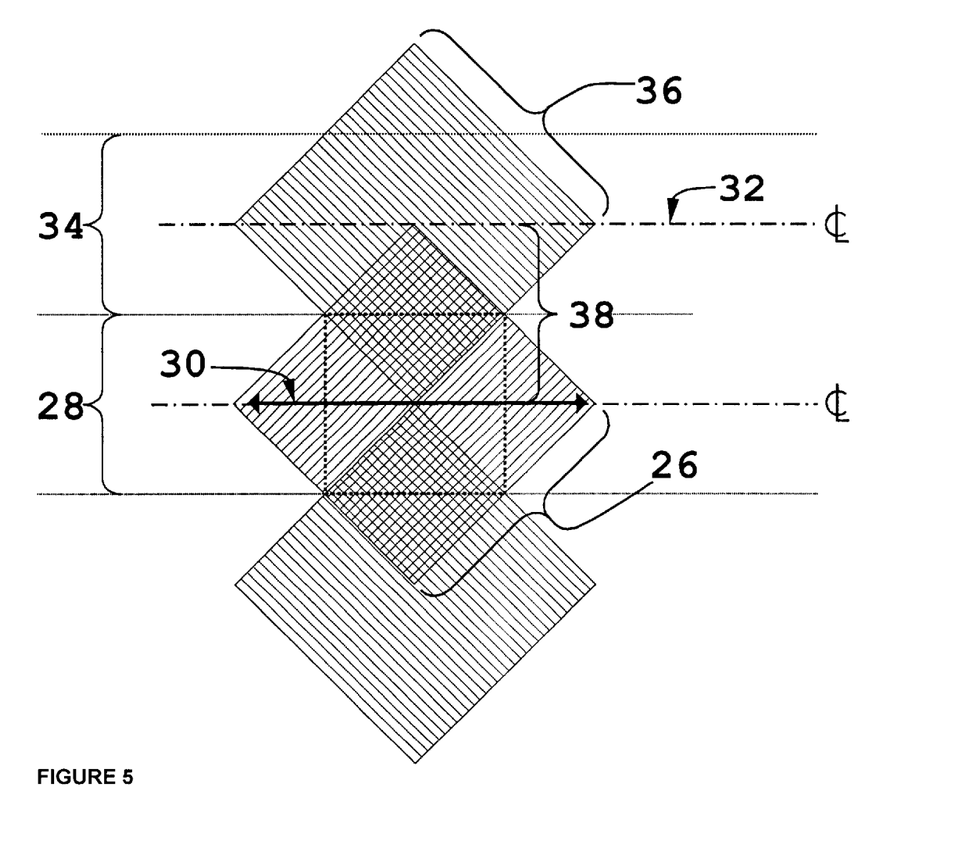
FIGS. 5 and 6 are schematic illustrations showing how longitudinally displaced pixel images overlay in the invention to form interpolated pixels.

Referring to FIG. 5, as the photosensitive material is exposed by the pixel images, the exposure contribution from pixel image 26 to its scan line 28 is greatest in the center portion because the pixel 26 is widest along that line. The exposure level decreases linearly with distance transverse to the center line 30 of the pixel. The exposure level decreases to the point where it is zero at the center line 32 of the adjacent scan line 34. Correspondingly, the exposure contribution from the adjacent pixel image 36 to the raster line 28 decreases with the distance from it's center line 32. It can be seen that at any point on a line between the center of the pixel image 26 and the center of the adjacent pixel image 36, the exposure level is comprised of a portion of each pixel image. Due to the shape of the pixel image, it can be seen that the exposure level in the region between the center line 30 of the pixel image 26 and center line 32 of the adjacent pixel image 36 is a linear average of pixel 26 and the adjacent pixel 36.

Figure 6:
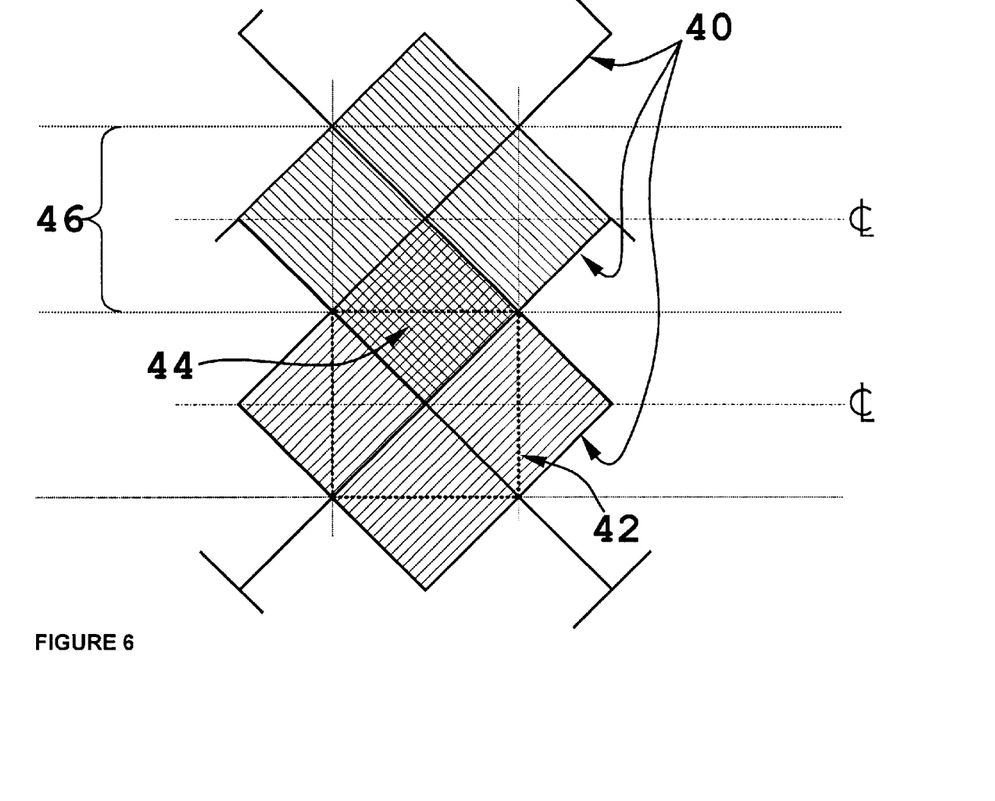

FIG. 6 shows the pattern of diamond pixels 40 relative to a traditional square pixel pattern 42 as represented in FIG. 3. It can be seen that the overlapping of the diamond pixels 40 generates diamond shaped interpolated pixels 44. The interpolated pixels have an area equal to about 25% of the original pixels 40. The side dimension of the diamond shaped interpolated pixels 44 (which in a constructed exemplary embodiment is equal to 0.0047 inches) is 0.707 (=1/square root of 2) times the side dimension of the traditional square pixel 42. For a given data input, these smaller interpolated pixels 44 cause an increased visual resolution with a corresponding increase in apparent sharpness in the final image.

The interpolated pixels 44 create an effective blending because, in part:

1) The head is in motion as it exposes pixel images which causes the amount of light delivered to the photosensitive material to be greatest where the pixel is widest in the scan direction, and
2) The photosensitive material is generally not sufficiently resolute to resolve a sharp image of one diamond pixel. Consequently the material diffuses adjacent pixels into each other to some degree.

Figure 7:
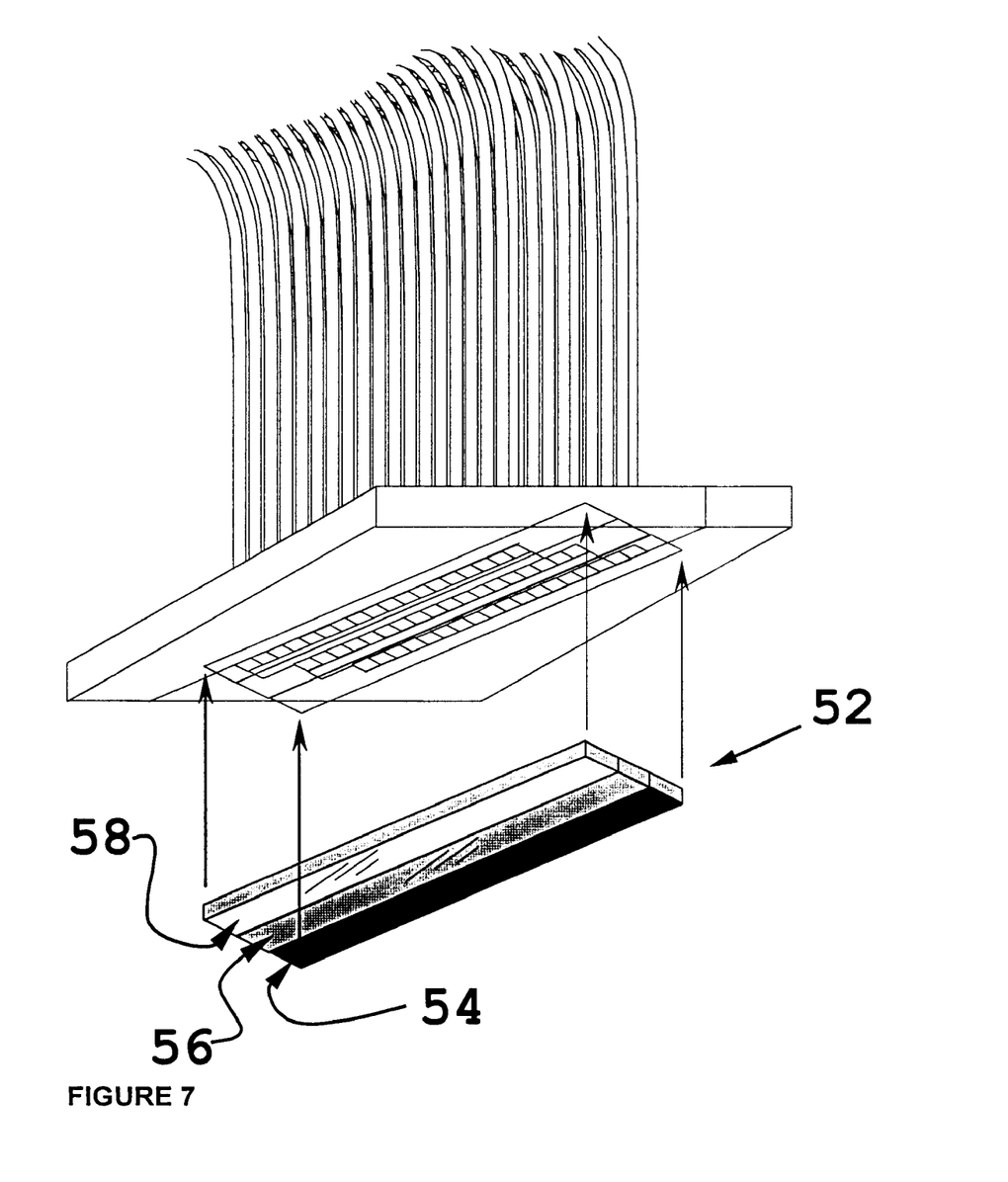
FIG. 7 is a schematic isometric illustration depicting a color matching filter for installation on the print head.
Figure 8:
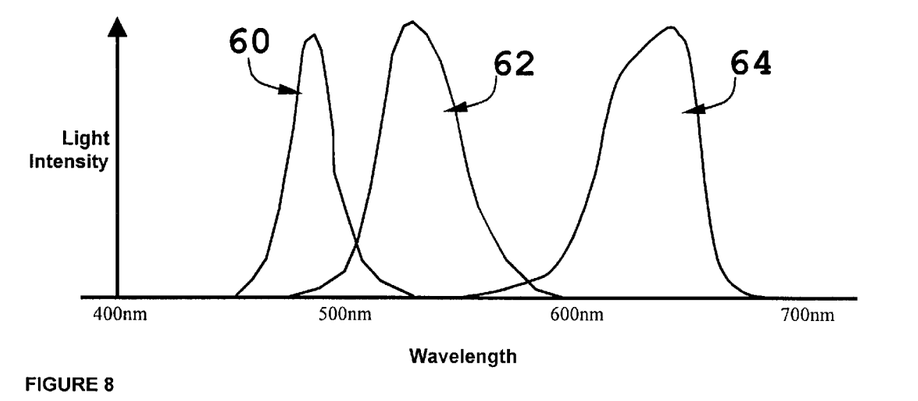
FIG. 8 depicts typical spectral characteristics of red, green and blue LED light sources.
Figure 9:
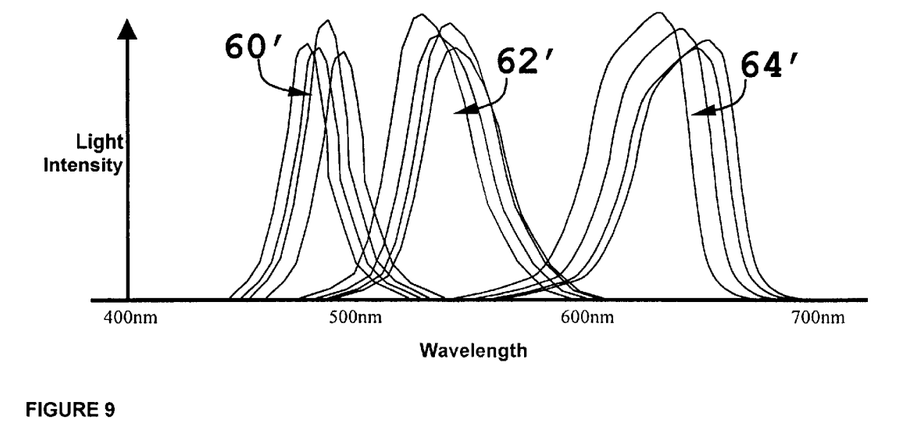
FIG. 9 depicts a typical range of spectral characteristics of a group of LED light sources.
Figure 10:
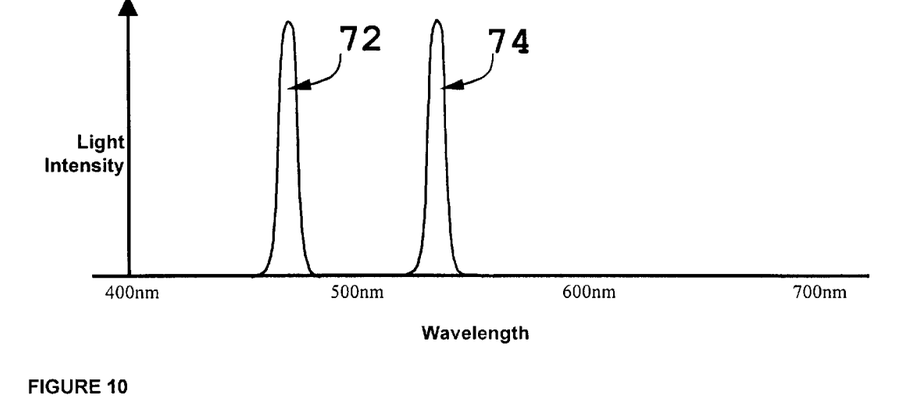
FIG. 10 shows the spectral transmission characteristics of the color matching filter shown in FIG. 7.

FIG. 8 shows the spectral characteristics of typical red 64, green 62 and blue 60 LED light sources. Due to manufacturing variations common in LED technology there can be considerable variation in the spectral output from similar LEDs. FIG. 9 shows a typical range of variation in spectral outputs in a small population of red, green and blue LED light sources, respectively 64', 62' and 60'. FIG. 10 shows the narrow pass spectral transmission characteristics 72, 74 of blue and green filters depicted in FIG. 7. By passing the energy of each of the LEDs in the population of curves shown in FIG. 9 through a filter whose spectral response is shown in FIG. 10, the spectral output of each of the LEDs is constrained to fall within the envelope of the filter. After filtering, all light sources will have substantially the same spectral characteristics and function substantially the same when exposing the different colors of the photosensitive material.

FIG. 7 shows a preferred color matching filter 52 installed on the print head 1. The color filter 52 is comprised of three sections: blue 54, green 56 and red or clear 58. The blue section 54 of the color filter has the narrow pass spectral transmission characteristic 72 shown in FIG. 10. The green section 56 of the color filter has the narrow pass spectral transmission characteristic 74 as shown in FIG. 10. The filter 52 is positioned over the output ends of the fiber optic tubes so that the light supplied by blue light sources passes through the blue portion 54 of the filter 52. Similarly, the light supplied by green light sources passes through the green portion 56 of the filter 52. Light supplied by red light sources passes through the red (or clear) portion 58 of the filter 52. In an embodiment of the invention constructed by the inventors, the light supplied by the red light sources, can pass through a substantially clear section of glass 58, i.e., the substrate for the blue 54 and green 56 filters because some photosensitive materials have a very high tolerance to spectral variations in the red band.

The foregoing describes applicant's preferred method and apparatus for producing high quality continuous tone and/or color images on photosensitive material. It is recognized that numerous modifications and/or variations will occur to those skilled in the art without departing from the spirit or scope of the invention.

What is claimed is:

1. Apparatus for producing a continuous tone and/or color composite image on a target surface extending in perpendicular lateral and longitudinal directions, said apparatus comprising:

a source of digital signals describing said composite image;

an imaging head comprised of a plurality of pixel image generators, each image generator being energizable to generate a substantially square pixel image;

said imaging head being mounted proximate to said target surface and oriented to offset each of said square pixel images by substantially 45° with respect to said lateral and longitudinal directions;

a controller responsive to said digital signals for selectively energizing said image generators and relatively moving said target surface and said imaging head along said lateral and/or longitudinal directions to sequentially image substantially identically shaped pixels onto said target surface to form said composite image, said composite image being formed of multiple longitudinally displaced pixel rows wherein each row is comprised of laterally displaced pixel images; and wherein (1) adjacent pixel images in each row partially overlap and/or (2) pixel images in adjacent rows partially overlap.

2. The apparatus of claim 1 wherein each pixel image overlaps an adjacent pixel image by substantially 25% to define an interpolated pixel area.

3. The apparatus of claim 1 wherein each pixel image overlaps multiple adjacent pixel images each by substantially 25% to define multiple interpolated pixel areas.

4. The apparatus of claim 1 wherein said imaging head is mounted for movement in said lateral direction.

5. The apparatus of claim 1 wherein said target surface is mounted for movement in said longitudinal direction.

6. The apparatus of claim 1 wherein each of said pixel image generators comprises a light source.

7. The apparatus of claim 1 wherein said plurality of pixel image generators includes a first group comprising light sources producing light having a first wavelength and a second group comprising light sources producing light having a second wavelength.

8. The apparatus of claim 7 further including a narrow pass spectral filter mounted between said first group of light sources and said target surface.

9. The apparatus of claim 1 wherein said plurality of pixel image generators includes red light sources, green light sources, and blue light sources.

10. A method of creating a continuous tone and/or color composite image on a target surface extending in perpendicular lateral and longitudinal directions, said method comprising:

generating a matrix comprised of a plurality of substantially square pixel images on said target surface with each pixel image inclined by substantially 45° with respect to said lateral and longitudinal directions, said matrix being comprised of multiple longitudinally displaced pixel rows wherein each row is comprised of laterally displaced pixel images; and partially overlapping (1) adjacent pixel images in each row and/or (2) pixel images in adjacent rows to create a field of substantially contiguous interpolated pixel areas forming said composite image.

11. The method of claim of 10 wherein each pixel image overlaps an adjacent pixel image to form an interpolated pixel area having an area substantially equal to one quarter of the area of a pixel image.

12. The method of claim 10 wherein said matrix of pixel images includes red, green, and blue pixel images.

* * * * *